US007880355B2

(12) United States Patent
Qu et al.

(10) Patent No.: US 7,880,355 B2
(45) Date of Patent: Feb. 1, 2011

(54) ELECTROMAGNETIC VARIABLE TRANSMISSION

(75) Inventors: Ronghai Qu, Clifton Park, NY (US); Wei Wu, Canton, MI (US); John M. Kern, Rexford, NY (US)

(73) Assignee: General Electric Company, Schenectady, NY (US)

(*) Notice: Subject to any disclaimer, the term of this patent is extended or adjusted under 35 U.S.C. 154(b) by 555 days.

(21) Appl. No.: 11/567,592

(22) Filed: Dec. 6, 2006

(65) Prior Publication Data

US 2008/0136189 A1 Jun. 12, 2008

(51) Int. Cl.
*H02K 49/02* (2006.01)
*H02K 16/02* (2006.01)

(52) U.S. Cl. .................. 310/103; 290/52; 310/114; 310/115

(58) Field of Classification Search ........... 310/103, 310/105, 114, 115; 290/52; 464/29; 74/DIG. 4; 417/420; 60/39.163
See application file for complete search history.

(56) References Cited

U.S. PATENT DOCUMENTS

| | | | | |
|---|---|---|---|---|
| 3,025,420 | A | * | 3/1962 | McCourt .................. 310/103 |
| 5,708,314 | A | * | 1/1998 | Law ....................... 310/114 |
| 5,804,934 | A | * | 9/1998 | Yamada et al. ............. 318/77 |
| 5,821,658 | A | * | 10/1998 | Boggs, III ................ 310/105 |
| 5,833,564 | A | * | 11/1998 | Harris ..................... 475/149 |
| 6,098,735 | A | * | 8/2000 | Sadarangani et al. ..... 180/65.24 |
| 6,182,522 | B1 | | 2/2001 | Tartivita |
| 6,217,298 | B1 | * | 4/2001 | Klaui ..................... 417/420 |
| 6,796,123 | B2 | | 9/2004 | Lasker |
| 6,914,344 | B2 | | 7/2005 | Franchet et al. |
| 6,920,023 | B2 | | 7/2005 | Dooley |
| 7,032,859 | B2 | | 4/2006 | Mohr |

(Continued)

FOREIGN PATENT DOCUMENTS

EP 0120687 A2 10/1984

(Continued)

OTHER PUBLICATIONS

Machine Translation of JP 11-164535, "Rotating Electric Machine, and Hybrid Driver Containing the Same and its Operating Method", Kazuto Sakai, Jun. 18, 1999.*

(Continued)

*Primary Examiner*—Karl I Tamai
(74) *Attorney, Agent, or Firm*—McNees Wallace & Nurick, LLC (57) ABSTRACT

An electromagnetically variable transmission includes an outer rotor and an inner rotor. The inner rotor is independently rotatable within a center aperture of the outer rotor. The outer rotor is independently rotatable about the inner rotor. One of the rotors has a plurality of permanent magnets configured in pairs and facing an air gap disposed between the outer rotor and the inner rotor. The other rotor has a plurality of slots spaced about a magnetically permeable core having embedded windings. The outer inner rotors are simultaneously rotatable in one direction. In response to rotation of the outer rotor portion and the inner rotor portion, a magnetic flux path is generated between the permanent magnet pairs, the air gap, the outer rotor core and the inner rotor portion core, to induce electrical power in the windings, which transfers power between the inner rotor portion and the outer rotor portion.

16 Claims, 9 Drawing Sheets

U.S. PATENT DOCUMENTS

| | | |
|---|---|---|
| 2005/0194231 A1 | 9/2005 | Babin |
| 2006/0016929 A1 | 1/2006 | Mohr |
| 2008/0136189 A1* | 6/2008 | Qu et al. ............... 290/52 |

FOREIGN PATENT DOCUMENTS

| | | | |
|---|---|---|---|
| EP | 0182616 A1 | | 5/1986 |
| EP | 0748953 A2 | | 12/1996 |
| EP | 1114952 A1 | | 7/2001 |
| EP | 1338832 A2 | | 8/2003 |
| JP | 58165700 | * | 9/1983 |
| JP | 01244926 A | | 9/1989 |
| JP | 11164535 | * | 6/1999 |
| WO | 95/02120 | * | 1/1995 |
| WO | 0111260 A2 | | 2/2001 |
| WO | 0113500 A1 | | 2/2001 |
| WO | 03075437 A1 | | 9/2003 |

OTHER PUBLICATIONS

Manual Translation of JP 58165700, "Electromagnetic Coupling", Yoshisuke Takita et al., Sep. 30, 1983.*

Martin J. Joeijmakers, Jan A. Ferreira; "The Electrical Variable Transmission"; Electrical Power Processing Unit, Delft University of Technology; Mekelweg 4, 2628 CD Delft, The Netherlands; m.j.hoeijmakers@ewi.tudelft.nl; 0-7803-8487-3/04 Copyright 2004 IEEE.

Martin J. Joeijmakers; "The Electrical Variable Transmission in a city bus"; Electrical Power Processing Unit, Delft University of Technology; Mekelweg 4, 2628 CD Delft, The Netherlands; m.j.hoeijmakers@ewi.tudelft.nl; 0-7803-8399-0/04; Copyright 2004 IEEE.

* cited by examiner

ELECTROMAGNETIC VARIABLE TRANSMISSION

FIELD OF THE INVENTION

The present invention is directed to a method and apparatus for transferring power between rotating shafts of an engine, and more specifically to an Electromagnetic Variable Transmission (EVT) for transferring torque and power directly from one rotating shaft with operating at one speed to another rotating shaft operating at a different speed than the first shaft.

BACKGROUND OF THE INVENTION

A gas turbine engine generally includes one or more compressors followed in turn by a combustor and high and low pressure turbines. These engine components are arranged in serial flow communication and disposed about a longitudinal axis centerline of the engine within an annular outer casing. The compressors are driven by the respective turbines and compressor air during operation. The compressor air is mixed with fuel and ignited in the combustor for generating hot combustion gases. The combustion gases flow through the high and low pressure turbines, which extract the energy generated by the hot combustion gases for driving the compressors, and for producing auxiliary output power.

The engine power is transferred either as shaft power or thrust for powering an aircraft in flight. For example, in other rotatable loads, such as a fan rotor in a by-pass turbofan engine, or propellers in a gas turbine propeller engine, power is extracted from the high and low pressure turbines for driving the respective fan rotor and the propellers.

It is well understood that individual components of turbofan engines, in operation, require different power parameters. For example, the fan rotational speed is limited to a degree by the tip velocity and, since the fan diameter is very large, rotational speed must be very low. The core compressor, on the other hand, because of its much smaller tip diameter, can be driven at a higher rotational speed. Therefore, separate high and low turbines with independent power transmitting devices are necessary for the fan and core compressor in aircraft gas turbine engines. Furthermore since a turbine is most efficient at higher rotational speeds, the lower speed turbine driving the fan requires additional stages to extract the necessary power.

Many new aircraft systems are designed to accommodate electrical loads that are greater than those on current aircraft systems. The electrical system specifications of commercial airliner designs currently being developed may demand up to twice the electrical power of current commercial airliners. This increased electrical power demand must be derived from mechanical power extracted from the engines that power the aircraft. When operating an aircraft engine at relatively low power levels, e.g., while idly descending from altitude, extracting this additional electrical power from the engine mechanical power may reduce the ability to operate the engine properly.

Traditionally, electrical power is extracted from the high-pressure (HP) engine spool in a gas turbine engine. The relatively high operating speed of the HP engine spool makes it an ideal source of mechanical power to drive the electrical generators connected to the engine. However, it is desirable to draw power from additional sources within the engine, rather than rely solely on the HP engine spool to drive the electrical generators. The LP engine spool provides an alternate source of power transfer, however, the relatively lower speed of the LP engine spool typically requires the use of a gearbox, as slow-speed electrical generators are often larger than similarly rated electrical generators operating at higher speeds. The boost cavity of gas turbine engines has available space that is capable of housing an inside out electric generator, however, the boost section rotates at the speed of the LP engine spool.

However, extracting this additional mechanical power from an engine when it is operating at relatively low power levels (e.g., at or near idle descending from altitude, low power for taxi, etc.) may lead to reduced engine operability. Traditionally, this power is extracted from the high-pressure (HP) engine spool. Its relatively high operating speed makes it an ideal source for mechanical power to drive electrical generators that are attached to the engine. However, it is desirable at times to increase the amount of power that is available on this spool, by transferring torque and power to it via some other means.

Another source of power within the engine is the low-pressure (LP) spool, which typically operates at speeds much slower than the HP spool, and over a relatively wider speed range. Tapping this low-speed mechanical power source without transformation result in impractically large generators. Many solutions to this transformation have been proposed, including various types of conventional transmissions, mechanical gearing, and electromechanical configurations. One solution is a turbine engine that utilizes a third, intermediate-pressure (IP) spool to drive a generator independently. However, this third spool is also required at times to couple to the HP spool. The means used to couple the IP and HP spools are mechanical clutch or viscous-type coupling mechanisms.

U.S. Pat. No. 6,895,741, issued May 24, 2005, and entitled "Differential Geared Turbine Engine with Torque Modulation Capacity", discloses a mechanically geared engine having three shafts. The fan, compressor, and turbine shafts are mechanically coupled by applying additional epicyclic gear arrangements. The effective gear ratio is variable through the use of electromagnetic machines and power conversion equipment.

Unlike the conventional electrical machine having a rotor or rotating portion, and a stator or stationary portion, the present invention includes two rotating portions. Further, in the conventional electrical machine, power is converted either from electrical to mechanical or from mechanical to electrical. By contrast, the present invention is used to transfer mechanical power from one rotating shaft to another without any electrical power output or input. This is also a major distinction between the present invention and previous variable transmissions.

SUMMARY OF THE INVENTION

The present invention is directed to an electromagnetically variable transmission for transferring power between a pair of independently rotating shafts. The electromagnetically variable transmission includes a hollow cylindrical outer rotor portion and a hollow cylindrical inner rotor portion, the inner rotor portion being disposed within a center aperture of the outer rotor portion and independently rotatable within the outer rotor portion. The outer rotor portion is independently rotatable circumferentially about the inner rotor portion. A first one of the outer rotor portion and the inner rotor portion has a plurality of permanent magnets pairs spaced about a first surface. The magnets are configured in pairs and facing an air gap. The air gap is disposed between the outer rotor portion and the inner rotor portion. The other one of the outer and inner rotor portions has a plurality of slots spaced about a magnetically permeable core portion. Some of the slots have windings embedded therein. The outer rotor portion and the inner rotor portion are simultaneously rotatable in one direction. In response to co-rotation of the outer rotor portion and the inner rotor portion, a magnetic flux path is generated between the plurality of permanent magnet pairs, the air gap and the inner rotor portion core. The magnetic flux path induces electrical power in the windings and causes mechanical power to be transferred between the inner rotor portion and the outer rotor portion.

In another aspect, the present invention is directed to a gas turbine engine. The gas turbine engine includes at least one compressor, a combustor, a high pressure turbine and a low pressure turbines arranged in serial flow communication and disposed about a longitudinal shaft of the engine within an annular outer casing. The compressor is driven by the high pressure and low pressure turbines and compressor air during operation. An electrical generator is disposed within the annular outer casing; and an electromagnetically variable transmission is provided for transferring power between a pair of independently rotating shafts, one of the independent rotating shafts being attached to the HP turbine, and the other independently rotating shaft being attached to the LP turbine. The electromagnetically variable transmission includes a hollow cylindrical outer rotor portion and a hollow cylindrical inner rotor portion, the inner rotor portion being disposed within a center aperture of the outer rotor portion and independently rotatable within the outer rotor portion. The outer rotor portion is independently rotatable circumferentially about the inner rotor portion. A first one of the outer rotor portion and the inner rotor portion has a plurality of permanent magnets pairs spaced about a first surface. The magnets are configured in pairs and facing an air gap. The air gap is disposed between the outer rotor portion and the inner rotor portion. The other one of the outer and inner rotor portions has a plurality of slots spaced about a magnetically permeable core portion. Some of the slots have windings embedded therein. The outer rotor portion and the inner rotor portion are simultaneously rotatable in one direction. In response to co-rotation of the outer rotor portion and the inner rotor portion, a magnetic flux path is generated between the plurality of permanent magnet pairs, the air gap, the outer rotor core and the inner rotor portion core. The magnetic flux path induces electrical power in the windings and causes mechanical power to be transferred between the inner rotor portion and the outer rotor portion.

An advantage of the present invention is torque transfer between concurrently rotating shafts is achieved through a rotating electromagnetic field without any mechanical connection between the two shafts. Induced field current in the winding is all that is required to generate electromagnetic fields in the air gap to interact with electromagnetic fields driven by the permanent magnets on the other rotor to transfer torque and power from the PM rotor, on which the permanent magnets are fixed to, to the induction rotor, the rotor with windings. Since no electric power flow occurs into or out of the EVT, there is no requirement for a power converter and associated control that are typically provided in conventional power transfer devices, e.g. electrical motors and generators.

Another advantage of the present invention is increased fuel efficiency, reliability and fault tolerance.

A further advantage of the present invention is the ability to transfer power from low speed LP turbine shaft to the high speed turbine shaft, with a variable speed ratio for transferring power over the entire speed range of the engine. Using electromagnetic techniques mechanical power is transferred without creating a mechanical linkage between the LP turbine shaft and the HP turbine shaft. Also there is no audible noise related to a mechanical gear due to its absence.

Yet another advantage of the present invention is that an external electrical power source is not required, and the control circuit for the internally-generated field currents is uncomplicated.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
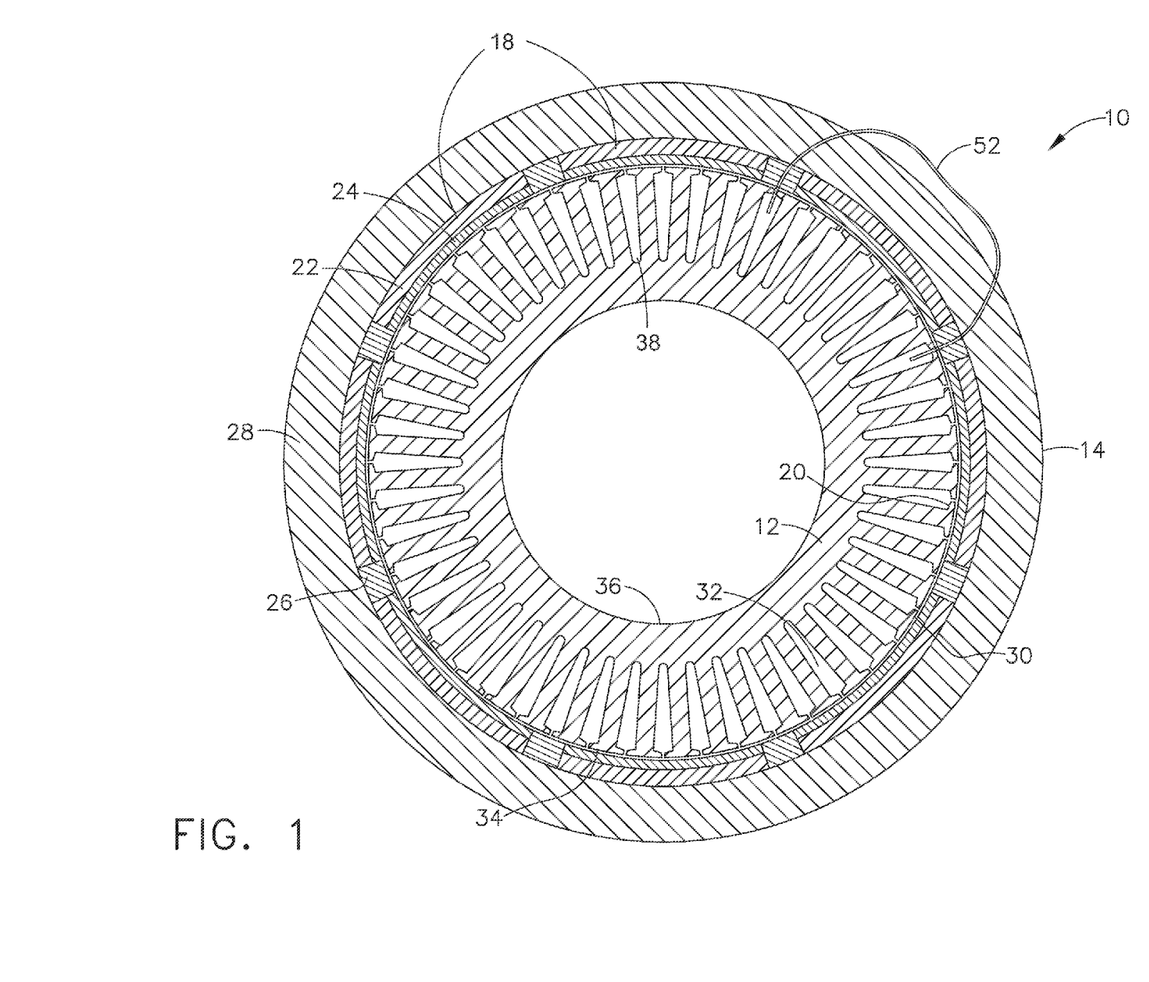
FIG. 1 is a cross-sectional schematic view of one embodiment of an electromagnetically variable transmission of the present invention.

Referring to FIG. 1, an electromagnetically variable transmission (EVT) 10 includes two rotating components, an inner rotor 12 and an outer rotor 14. Both the inner rotor 12 and the outer rotor 14 rotate in the same direction around a common axis 16. The outer rotor 14 has multiple permanent magnet pole pairs 18 facing the outer surface 34 of the inner rotor 12. The magnets of the pole-pairs 18 are oriented in alternating fashion, such that one magnet of the pair has its north pole directed radially outwards and the adjacent magnet has its south pole directed radially inwards. An optional pole cap 24 may be attached on the top of each magnet segment 22 to reduce losses induced in the magnets due to flux slot harmonics inside the magnets 22 when there is a large difference between the rotational velocity of the inner rotor 12 and the outer rotor 14. The pole caps 24 may be laminated stack, soft magnetic composite material, or other magnetically permeable material suitable to form a magnetic path. Claps 26 are positioned between the magnets 22 to secure the magnets 22 and pole caps 24 to the solid rotor core 28. The rotor core 28 is preferably made of solid steel or a laminated stack of steel plates. The rotor core 28 is similar in construction to a permanent magnet (PM) rotor in an inside-out PM electrical machine.

The outer rotor 14 and the inner rotor 12 are separated by an air gap 30. The inner rotor 12 is constructed of steel laminations and windings similar to a conventional induction machine rotor. Slots 32 are located on the outer surface 34 of the inner rotor lamination 36. The slots 32 may be open, half-closed, or closed. Multiple-phase windings 38 (See, e.g., FIGS. 2-5) are disposed within the slots 32. The multiple-phase windings 38 form multiple pole pairs of the inner rotor 12. The number of pole pairs 18 on the outer rotor 14 is the same as the number of pole pairs of the inner rotor 12.

Figure 1A:
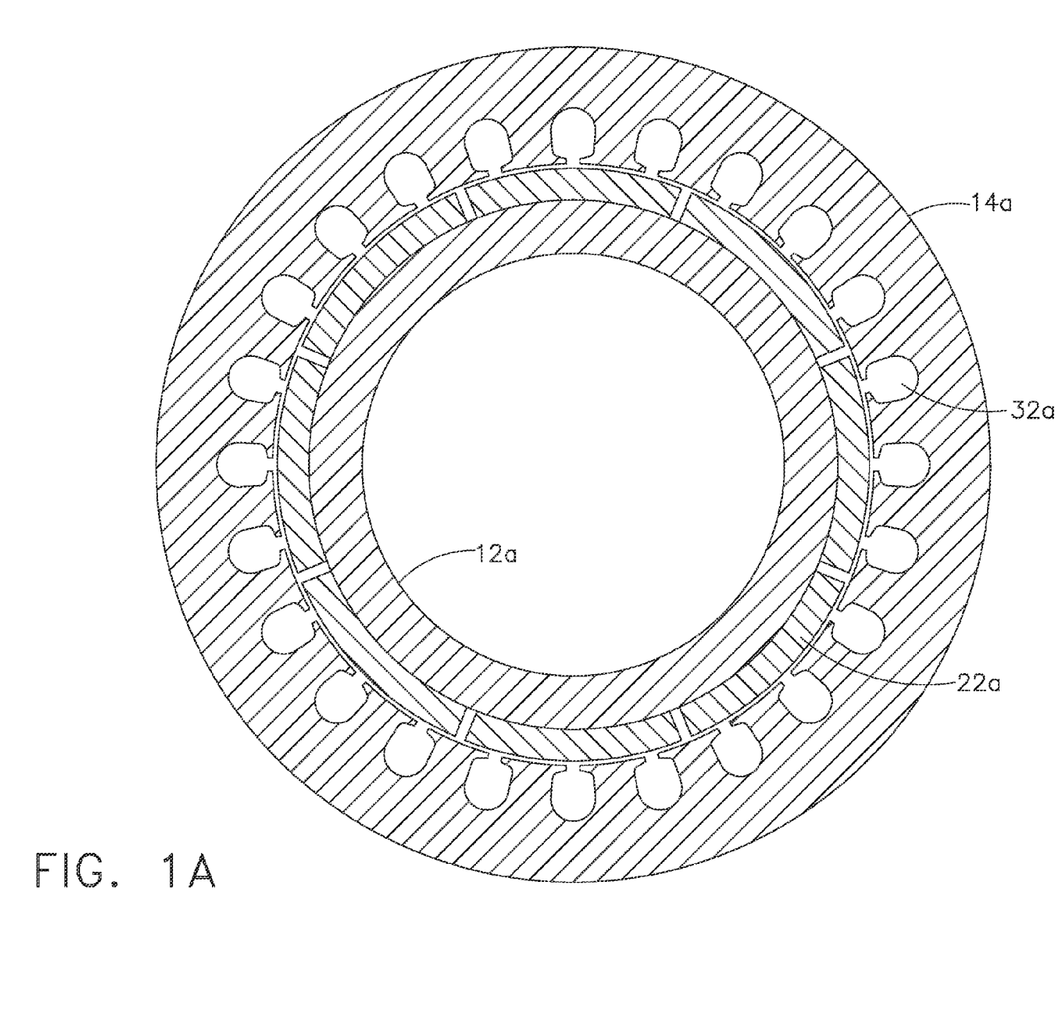
FIG. 1A is a cross-sectional schematic view of one embodiment of an electromagnetically variable transmission of the present invention.
Figure 2:
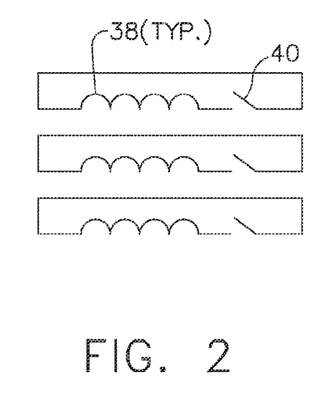
FIGS. 2-5 are various interconnection diagrams for the rotor windings, which interconnections can be used in the configurations of FIG. 1 (inner rotor windings) and FIG. 1A (outer rotor windings).
Figures 3, 5:
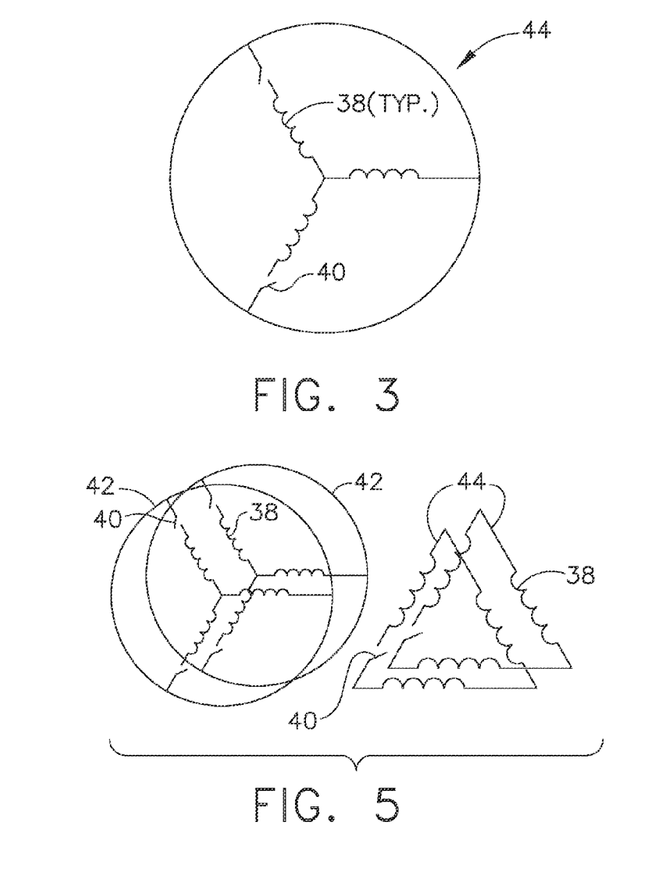
Figure 4:
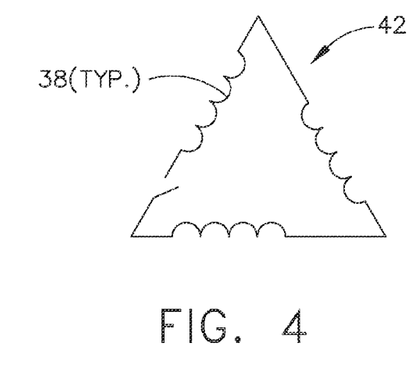

Referring to FIGS. 2 through 5, several exemplary interconnections for the rotor windings 38 [either the inner rotor winding in the embodiment of FIG. 1, or the outer rotor winding in the embodiment of FIG. 1A.] are shown. FIG. 2 shows the rotor windings 38 as three single-phase connections with switches 40 wired in series with each phase winding 38. The rotor windings in FIG. 3 are configured in a wye connection with switches 40 in two of the three legs of the wye connection, which is all that are required to switch off the current flowing in the wye circuit, although another switch 40 could be connected in the third phase. In FIG. 4, a delta-connected configuration is used for the rotor windings 38, and a single switch 40 is used to switch off current flowing in the delta circuit arrangement. In FIG. 5, there are multiple parallel circuits shown, which are multiple parallel combinations of the delta circuit 42 and the wye-connections 44 of FIGS. 3 and 4. Note that other interconnection configurations may also be employed within the scope of the present invention, as the configurations shown in FIGS. 2 through 5 are intended as examples and not to limit the various configurations that will be readily understood by those persons skilled in the art. Although the circuits shown in FIGS. 2 through 5 are preferably configured as 3-phase windings, any number of electrical phases can be used. The switches 40 are preferably a pair of silicon-controlled rectifiers (SCRs) connected in reverse parallel, or any other power devices having current control capability in both directions.

Figure 6:
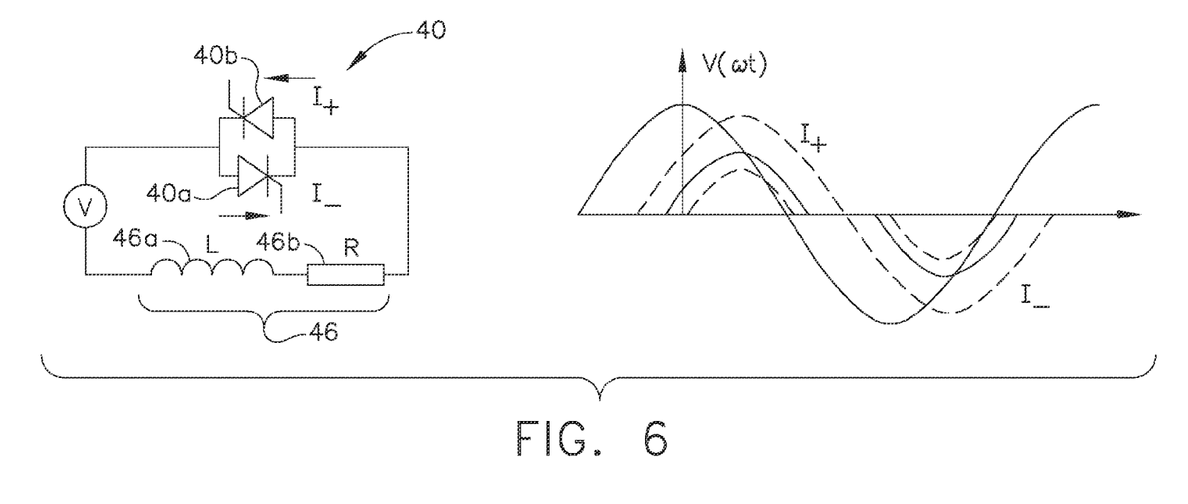
FIG. 6 is a schematic circuit diagram for a torque control circuit using silicon-controlled rectifiers (SCRs).
Figure 6A:
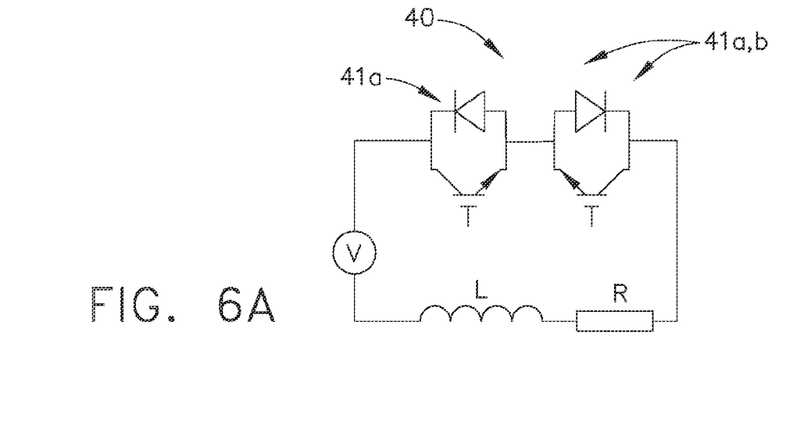
FIG. 6A is a schematic circuit diagram for a torque control circuit using insulated-gate bipolar transistor (IGBT) units in reverse series.

FIG. 6 shows an exemplary control circuit for controlling the torque and power transferred between the inner rotor 12 and the outer rotor 14. The circuit of FIG. 6 controls how much torque and power is transferred and when to transfer torque and power between the two rotors to satisfy the engine power requirement. An exemplary rotor coil 46 could represent a single coil 38, as in FIG. 2, or the rotor coil 46 could represent multiple coils 38. e.g. three series connected coils 38, as in FIG. 4. Also, switch 40 in FIGS. 2 through 5 could be either switch 40 in FIG. 6 or the switch 40 in FIG. 6A. The V, L, and R are a net effect of the coil(s) in the circuits embodied in FIGS. 2 through 5. An exemplary rotor coil 38 is represented as an inductance 46a (L) and resistance 46b (R). A voltage V is induced in the winding 38 due to the variation of flux linked by the winding. The flux is driven by the magnets on the opposite rotor, while the flux variation is due to the relative speed of the two rotors. A pair of power devices 40a and 40b is arranged in reverse parallel. Preferably the power devices are silicon-controlled rectifiers (SCRs). Switch 40 can also consist of two insulated-gate bipolar transistor (IGBT) units 41a, 41b in FIG. 6A. The IGBT units 41a, 41b are connected in reverse series. Each of the IGBT units 41a, 41b consists of at least one IGBT and at least one diode that is in reverse parallel with the IGBT(s).

Figure 7:
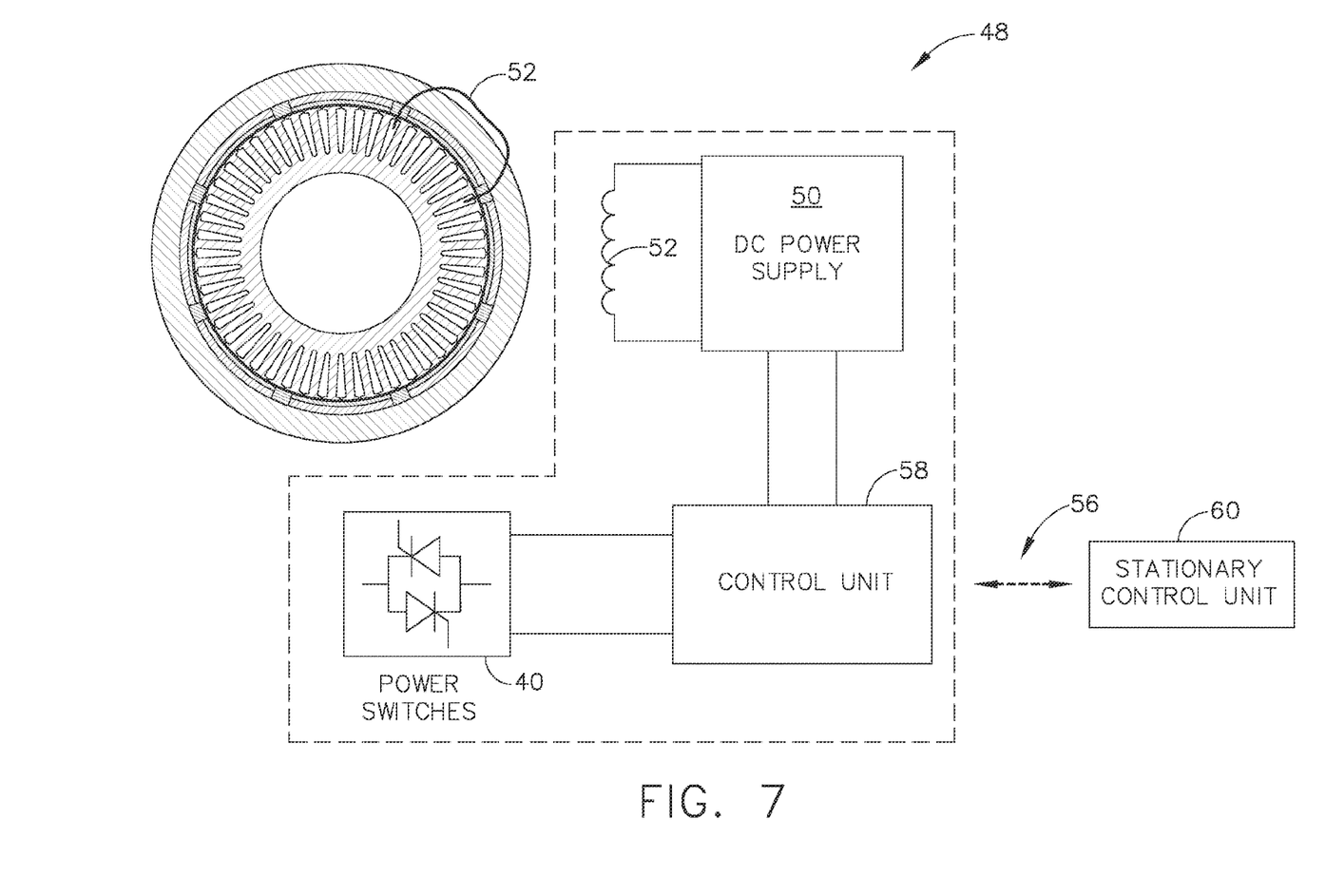
FIG. 7 is a schematic circuit diagram for the auxiliary control system.

Referring to FIG. 7, power for the torque control circuit in FIG. 6 may be provided through a power supply 50 that is energized by an auxiliary coil 52 on the rotor 14 driven by the HP spool 54. The whole control system 48 may be located on the HP spool 54, and powered by the HP spool 54, or alternately, may be powered by the LP spool. The control circuit 48 controls the current in the windings 38. Control circuit 48 must be located on the same induction rotor on which the windings 38 are located, to avoid wire connections between two rotating parts. For the same reason, the control circuit 48 must be powered by the same induction rotor. The induction rotor could be configured on either the inside or outside, as shown in FIGS. 1 and 1A. A control signal indicated by a bi-directional arrow 56 may be transmitted wirelessly to the control unit 58 by an external stationary control unit 60.

Figure 8:
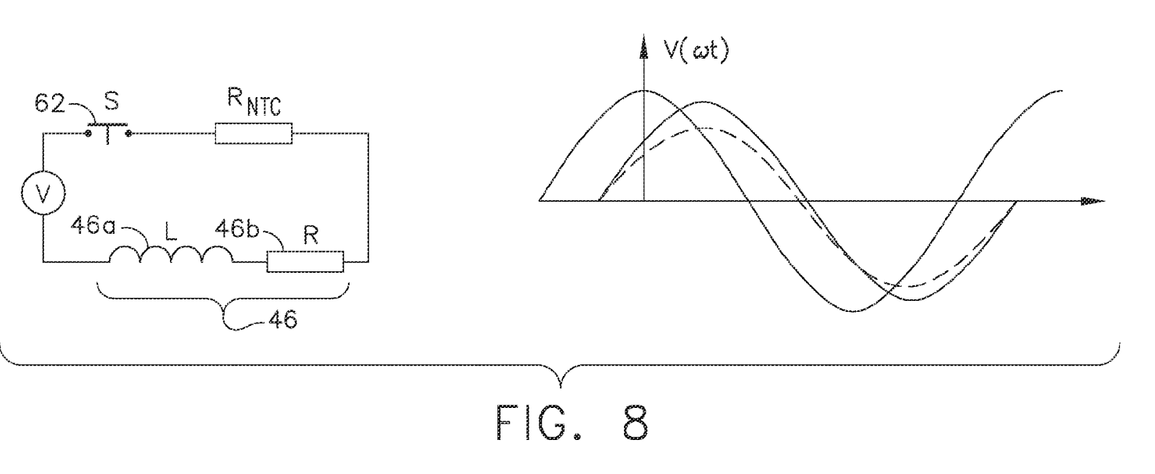
FIG. 8 is an alternate embodiment of the control circuit for torque control.

Referring next to FIG. 8, there is another exemplary control circuit for torque control. In this embodiment a switch 62 controlled by centrifugal force of the rotors 12 and 14a controls the speed at which to transfer torque between LP and HP spools. Switch 62 must be on the same induction rotor as the windings 38, and the induction rotor could be located on either the inside or the outside as shown in FIGS. 1 and 1A. Rotor coil 46 has a characteristic inductance L and resistance R, and an induced voltage V. Centrifugal switch 62 is closed when the rotor 12 or 14a is rotating at low speed and opens when the rotor 12 or 14a exceeds a predetermined speed, in response to the centrifugal force applied by the rotational speed. Optionally, if necessary, a resistor having a resistance $R_{NTC}$ with negative temperature coefficient may be included. The resistor $R_{NTC}$ limits the current pulse that occurs when the centrifugal switch 62 closes. Transfer of torque occurs between the LP spool 64 and the HP spool 54, when the centrifugal switch 62 is in the closed position, and the HP and LP spools 64, 54 are disengaged when the centrifugal switch is open.

Figure 9:
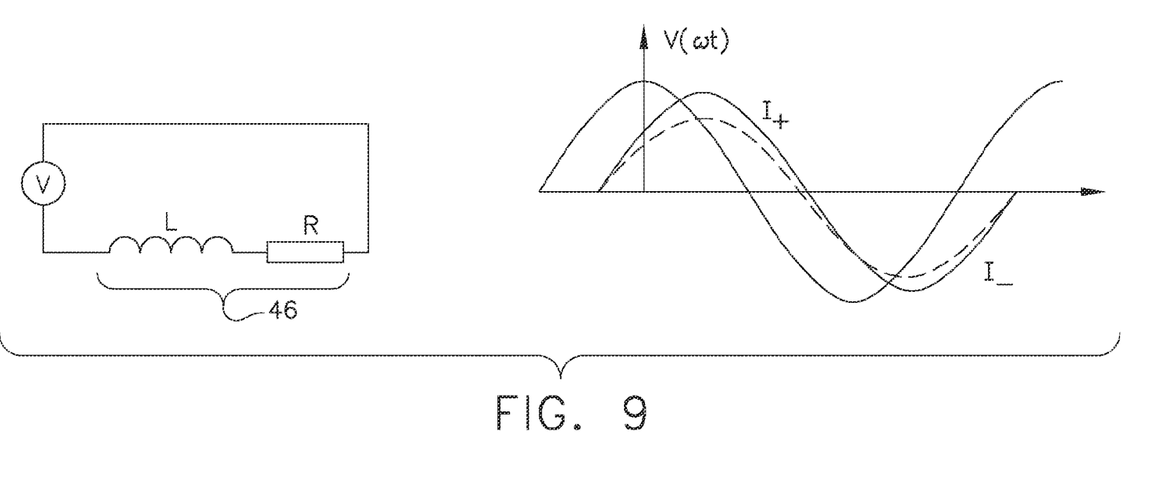
FIG. 9 is an alternate embodiment of the control circuit option for torque control.
Figure 10:
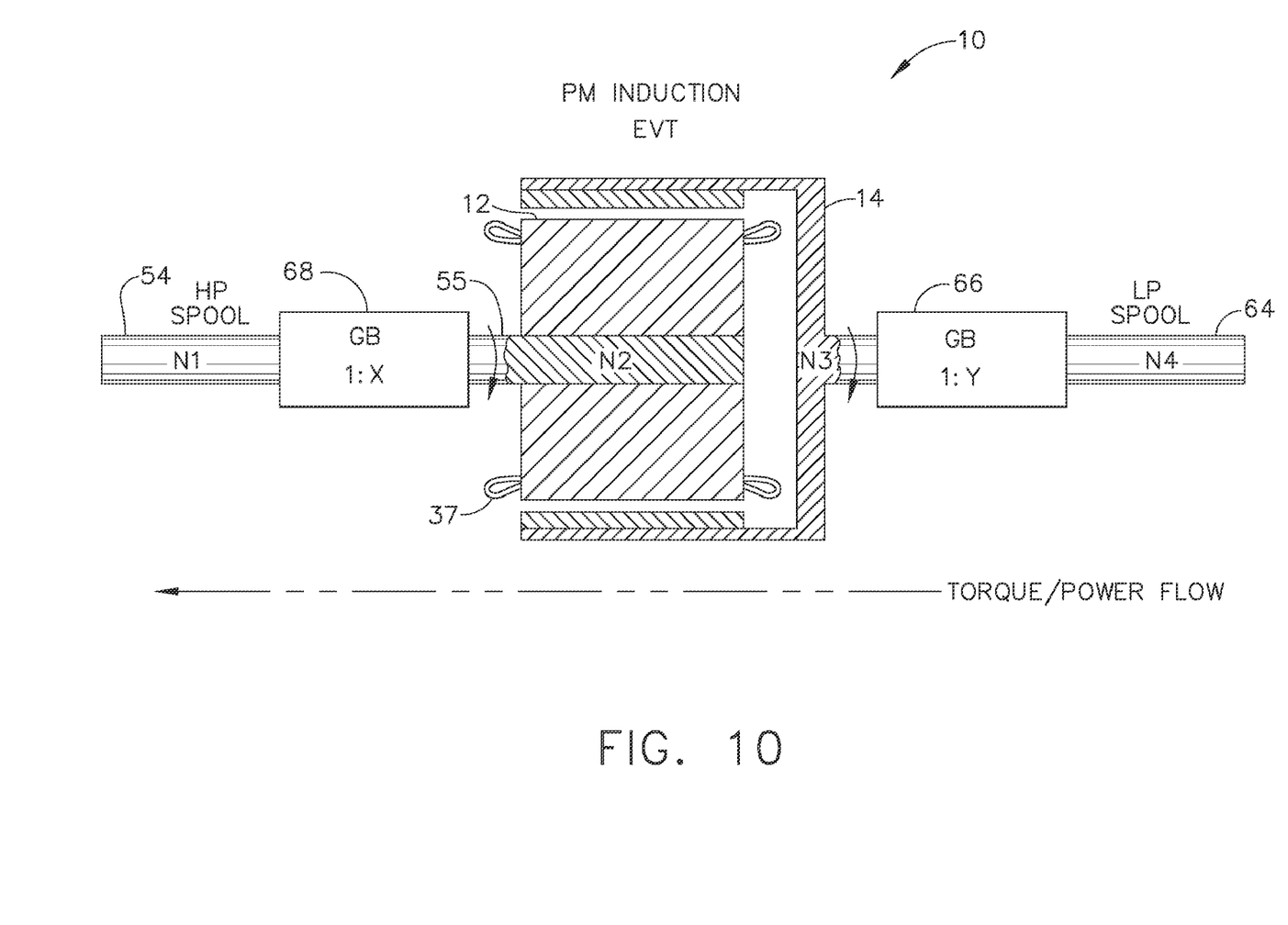
FIG. 10 is a preferred embodiment of the present invention corresponding to the EVT arrangement of FIG. 1.

In FIG. 9, there is another exemplary control circuit option for torque control. In the configuration shown in FIG. 9, a control switch is not required. Torque transfer is controlled by the slip frequency, or the speed difference between two shafts. During aircraft cruise or taking off, the HP and LP spools rotate at higher speed and the speed difference between two spools or between the two rotors of the EVT is smaller. Therefore the slip frequency or the frequency of the current induced in the windings is lower. During aircraft landing or idle descending, the LP spool speed is reduced more than HP spool speed change and the slip frequency is larger. Based on induction machine principle, there will be more torque and power transferred between the two EVT rotors at a larger slip frequency than at a small slip frequency. The gear ratios of gearboxes 66 and 68 in FIG. 10 are selected such that the desired slip frequency is achieved at both the high and low speed range. The characteristic inductance L and resistance R of the rotor coil 46 are designed, e.g. by adjusting turns and conductor cross-section area, using skin effect for high slip frequency, or by selecting material in such a way that the desired torque can be transferred from LP spool to HP spool when it is needed at or near idle descent, while the torque transferring is minimized when it is not required during cruise and taking off.

According to another embodiment of the present invention, there are one or more auxiliary coils 52 in the rotor slots shown in FIG. 1. The induced electrical power in the coil or coils 52 can be used to supply power for the control circuit of the switch or switches in the circuits that are located on the rotor.

The SCR switches 40, control unit 58 and power supply 50 are preferably mounted on the same rotor as the main rotor windings 38, so slip rings are not required to electrically connect a stationary portion to the rotating windings 38.

Signals required to control the SCR switches 40 can be transmitted wirelessly to the inner rotor 12 (See FIG. 7).

FIG. 1A shows an alternate embodiment of the present invention. In this configuration, the rotors are arranged as the reverse of FIG. 1—the outer rotor 14*a* has slots 32*a* with windings is now outside, and the inner rotor 12*a* has permanent magnet PM poles 22*a*.

In either of the configurations in FIG. 1 or FIG. 1A, the magnetic flux is driven by the permanent magnets and link the rotor winding 38 across the air gap 30, as with conventional PM machines. When the PM rotor 14, 12*a* rotates, a rotating flux field (not shown) is induced in the air gap 30. Based on conventional induction machine principles, voltage and current is induced in the coils when the PM rotor 14 or 12*a* is rotating at a different speed than the induction rotor 12 or 14*a*. When the PM rotor 14 or 12*a* is rotating faster than the induction rotor 12 or 14*a*, torque is transferred from the PM rotor 14 or 12*a* to the induction rotor 12 or 14*a*. When the PM rotor 14 or 12*a* is rotating lower than the induction rotor 12 or 14*a*, torque is transferred from the induction rotor 12 or 14*a* to the PM rotor 14 or 12*a*.

FIG. 10 shows a preferred embodiment of the present invention corresponding to the EVT arrangement of FIG. 1, in which an EVT 10 includes the outer PM-type rotor 14 connected to the LP spool 64, and the inner induction-type rotor 12 connected to the HP spool 54. The interconnected windings of the inner rotor 12 are indicated by loops 37. The LP spool speed N4 is stepped up by gearbox 1:Y to speed N3. In order to transfer torque from the LP spool 64 to the HP spool 54, the rotational speed N3 of the outer or PM rotor 14 has to be higher than the speed N2 of the inner or induction rotor 12. A first gearbox 68 having a gear ratio of 1:X is used to couple the HP spool 54 to the inner rotor 12, and a second gearbox 66 having a gear ration of 1:Y is used to couple the LP spool 64 to the outer rotor 14. The gearboxes 66, 68 are used to match the speed N1 of the HP spool 54 and the speed N4 of the LP spool 64 to correspond to the desired EVT rotor speeds, N2 and N3, respectively. Depending on the engine spool operating speeds and EVT rotor speeds, one of the gearboxes 66, 68 may be omitted. Outer rotor speed N3 is greater than the speed N2 of the inner rotor 12 so that torque and power will be transferred to the shaft 55 at speed N2 based on the induction principle. A variable gear ratio may be employed on one or both of the gearboxes 66, 68. In the configuration of FIG. 1, with LP spool rotating at speed N4 and the HP spool rotating at speed N1, the speed conversions are related by Equation 1:

$$N1*X=N2<N3=N4/Y \qquad \text{Equation 1}$$

where N4<N1

Figure 11:
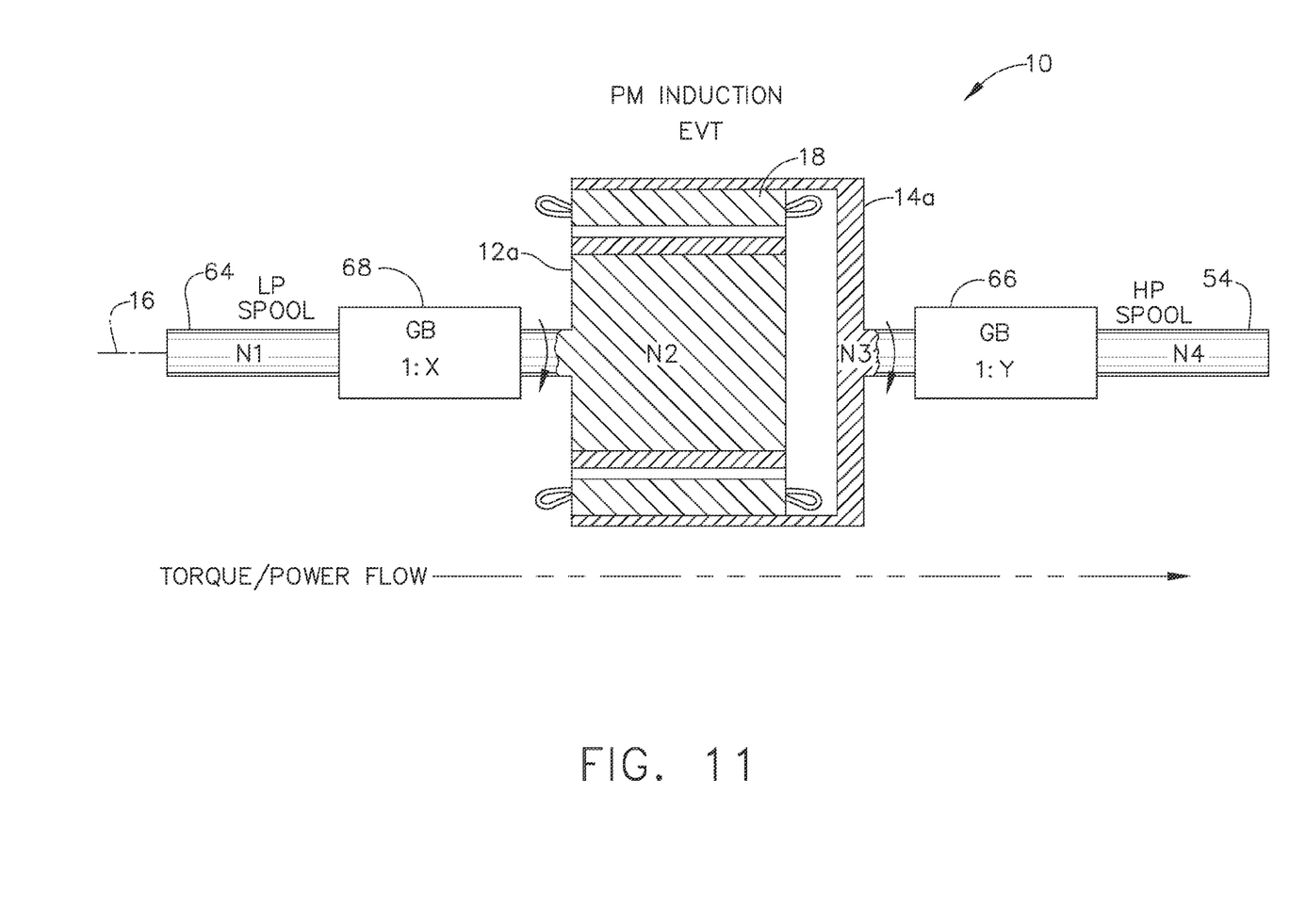
FIG. 11 is an alternate embodiment of the present invention corresponding to the EVT arrangement of FIG. 1A

FIG. 11 shows an alternate embodiment of the present invention corresponding to the EVT arrangement of FIG. 1A, in which an EVT 10 is connected to the LP spool 64 and the HP spool 54 of an aircraft engine through gearboxes 66, 68. In order to transfer torque from the LP spool 64 to the HP spool 54, the rotational speed N3 of the outer induction-type rotor 14*a* (with winding interconnections indicated by loops 37) has to be lower than the speed N2 of the inner PM-type rotor 12*a*. A first gearbox 68 having a gear ratio of 1:X is used to couple the LP spool 64 to the inner rotor 12*a*, and a second gearbox 66 having a gear ratio of 1:Y is used to couple the HP spool 54 to the outer rotor 14*a*. The gearbox 66 is used to match the outer rotor speed N3 of the EVT 10 to speed N4 of the HP spool 54. Depending on the engine spool operating speeds and EVT rotor speeds, one of the gearboxes 66, 68 may be omitted. In the configuration of FIG. 11, with HP spool rotating at N4 and the LP spool rotating at N1, the speed conversions are related by Equation 2:

$$N1*X=N2>N3=N4/Y \qquad \text{Equation 2}$$

wherein N4>N1; and the gear ratio X>=1

Optionally, a variable gear ratio may be applied.

As an option, either of the gearboxes 66, 68 described above could have variable gear ratio to reduce the speed range of two rotors in the EVT, therefore reducing the maximum speed and associated mechanical stresses when either of the LP spool or HP spool speed range is too great.

Figure 12:
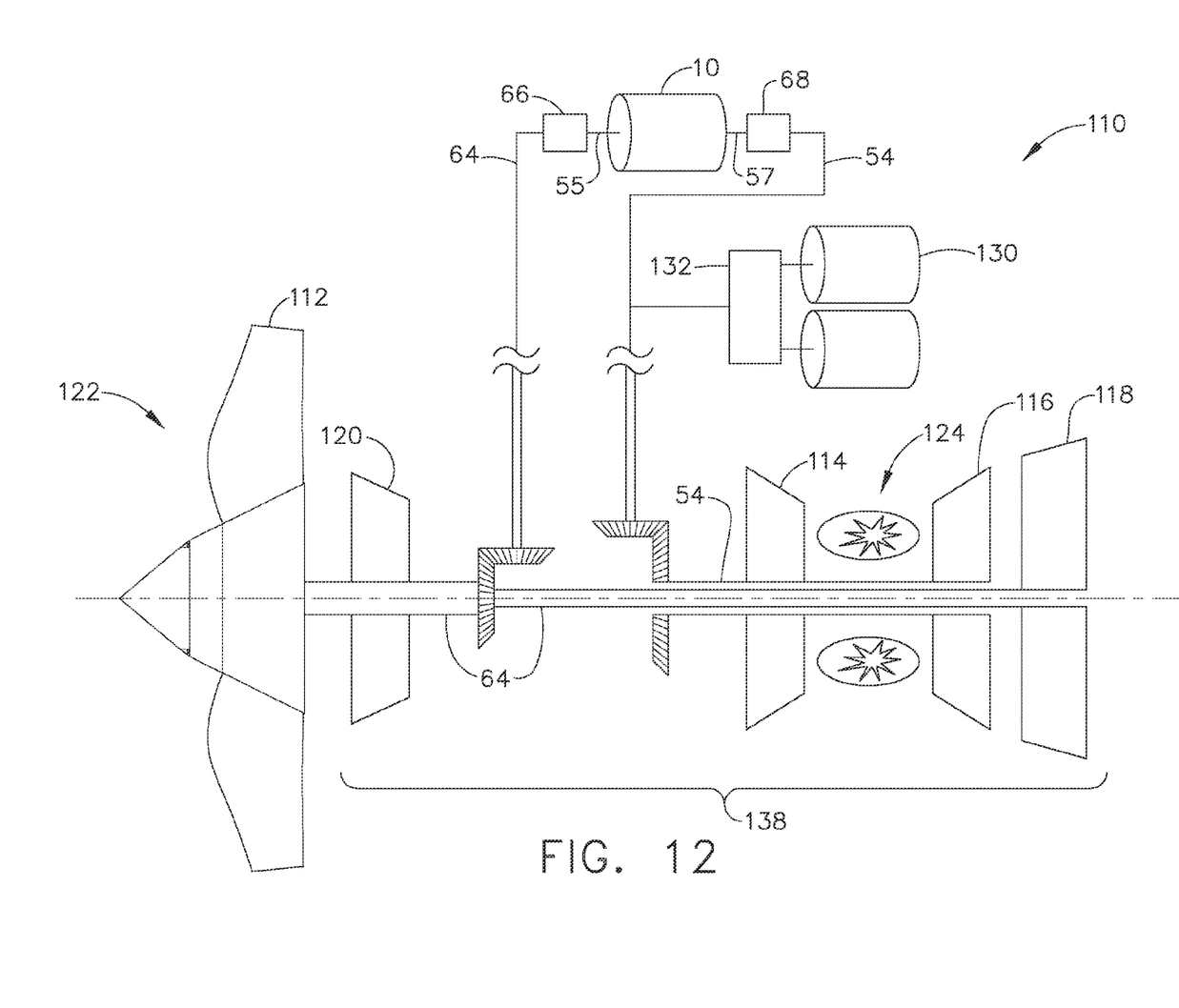
FIG. 12 is a schematic diagram of a PM induction EVT of the present invention in an aircraft engine.

Referring next to FIG. 12, an exemplary arrangement of the PM induction EVT in an aircraft engine 110 has a core engine 138 including in serial, axial flow relationship, a low pressure compressor or booster compressor 120, a high pressure compressor 114, a combustor or burner 124, a high pressure turbine 116 and a low pressure turbine 118. Core engine 138 is downstream from an inlet 122 and a fan 112. Fan 112 is in serial, axial flow relationship with core engine 138 and a bypass duct and a bypass nozzle (not shown). Fan 112, compressor 114, and low pressure turbine 118 are coupled by a first shaft 64, and compressor 114 and turbine 116 are coupled with a second shaft 54. A portion of airflow entering inlet 122 is channeled through the bypass duct and exhausted through bypass nozzle, and remaining airflow passes through core engine 138 and is exhausted through a core engine nozzle. The EVT 10 is coupled to LP shaft or spool 64 through gearbox 66 and shaft 57. The output shaft 57 of the EVT 10 is connected to the HP shaft or spool 54 through gearbox 68. A pair of starter/generators 130 is coupled to HP spool 54 through a primary gearbox, to receive power from or to provide power to the HP spool, depending whether the pair of starter/generators 130 is operated as starters or generators. FIG. 12 is just one example out of many possible starter/generator 130 and primary gearbox 132 configurations that may be used with the present invention for sharing torque between the LP shaft 64 and the HP shaft 54, as will be readily appreciated by those skilled in the art. Also, the EVT 10 may be located either internally or externally of the engine envelope.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An electromagnetically variable transmission for transferring power between a pair of independently rotating shafts, comprising:

a hollow cylindrical outer rotor portion and a cylindrical inner rotor portion, the inner rotor being disposed within a center aperture of the outer rotor portion and independently rotatable within the outer rotor portion, and the outer rotor independently rotatable circumferentially about the inner rotor portion;

a first one of the outer rotor portion and the inner rotor portion having a plurality of permanent magnets pairs spaced about a first surface, the magnets being configured in pairs and facing an air gap, the air gap disposed between the outer rotor portion and the inner rotor portion;

an other one of the outer and inner rotor portions having a plurality of slots spaced about a magnetically permeable core portion, at least some of the slots including windings embedded therein, the windings arranged in pole pairs such that each pole pair corresponds to a permanent magnet pair of the first one of the outer rotor portion and the inner rotor portion;

the outer rotor portion and the inner rotor portion being simultaneously rotatable in one direction; and at least one auxiliary coil for powering a torque control circuit, the torque control circuit including a power supply, a controller portion and at least one power switch, the controller portion configured to operate the power switch for switching a circulating current in at least one of the windings for controlling the mechanical power transfer;

wherein, in response to co-rotation of the outer rotor portion and the inner rotor portion, a magnetic flux path is generated between the plurality of permanent magnet pairs, the air gap and the outer and inner rotor portion cores, the magnetic flux path inducing electrical power in the windings and causing mechanical power to be transferred between the inner rotor portion and the outer rotor portion.

2. The electromagnetically variable transmission of claim 1, wherein the first one of the outer rotor portion and the inner rotor portion is the outer rotor portion, and the other one is the inner rotor portion.

3. The electromagnetically variable transmission of claim 1, wherein the first one of the outer rotor portion and the inner rotor portion is the inner rotor portion, and the other one is the outer rotor portion.

4. The electromagnetically variable transmission of claim 1, wherein the windings are configured in a plurality of single phase loops, each loop having a switch connected in series with a single winding to form a closed current loop when the switch is in a conducting state.

5. The electromagnetically variable transmission of claim 1, wherein the windings are configured in a wye configuration having three legs, at least two of the three legs having switches for regulating current flow through the windings.

6. The electromagnetically variable transmission of claim 1, wherein the windings are configured with three of the windings series connected in a loop and a single switch disposed in the series loop to regulate current flowing through the windings.

7. The electromagnetically variable transmission of claim 1, wherein the windings are configured in multiple parallel circuits configured in one of a plurality of multiple wye connections, a plurality of delta configurations, and combinations thereof.

8. The electromagnetically variable transmission of claim 1, wherein the windings, the at least one auxiliary coil and the torque control circuit control unit are mounted on one of the outer rotor portion or the inner rotor portion.

9. The electromagnetically variable transmission of claim 8, wherein the torque control circuit also comprises a stationary controller in wireless communication with the controller portion for transmitting control signal to the torque control circuit while rotating on a shaft of the outer rotor portion or the inner rotor portion.

10. The electromagnetically variable transmission of claim 1, wherein the torque control circuit is controlled by a slip frequency between the shafts.

11. The electromagnetically variable transmission of claim 1, wherein the torque control circuit comprises at least one centrifugal switch, the centrifugal switch being controlled by centrifugal force of the rotors to control the speed at which to transfer torque between the shafts.

12. The electromagnetically variable transmission of claim 1, wherein each power switch comprises at least one pair of silicon-controlled rectifiers (SCRs) connected in reverse parallel reverse parallel.

13. The electromagnetically variable transmission of claim 1, wherein each power switch comprises at least one pair of insulated-gate bipolar transistor units connected in reverse series, each insulated-gate bipolar transistor unit having at least one insulated-gate bipolar transistor and at least one diode that is in reverse parallel with the insulated-gate bipolar transistor.

14. A gas turbine engine comprising:

at least one compressor, a combustor, a high pressure turbine and a low pressure turbines arranged in serial flow communication and disposed about a longitudinal shaft of the engine within an annular outer casing; the at least one compressor driven by the high pressure and low pressure turbines and compressor air during operation; an electrical generator disposed within the annular outer casing, and an electromagnetically variable transmission for transferring power between a pair of independently rotating shafts, the electromagnetically variable transmission comprising:
    a hollow cylindrical outer rotor portion and a cylindrical inner rotor portion, the inner rotor being disposed within a center aperture of the outer rotor portion and independently rotatable within the outer rotor portion, and the outer rotor independently rotatable circumferentially about the inner rotor portion;
    a first one of the outer rotor portion and the inner rotor portion having a plurality of permanent magnets pairs spaced about a first surface, the magnets being configured in pairs and facing an air gap, the air gap disposed between the outer rotor portion and the inner rotor portion;
    another one of the outer and inner rotor portions having a plurality of slots spaced about a magnetically permeable core portion, at least some of the slots including windings embedded therein, the windings arranged in pole pairs such that each pole pair corresponds to a permanent magnet pair of the first one of the outer rotor portion and the inner rotor portion;
    the outer rotor portion and the inner rotor portion being simultaneously rotatable in one direction; and
    at least one auxiliary coil for powering a torque control circuit, the torque control circuit including a power supply, a controller portion and at least one power switch, the controller portion configured to operate the power switch for switching a circulating current in at least one of the windings for controlling the mechanical power transfer;
    wherein, in response to co-rotation of the outer rotor portion and the inner rotor portion, a magnetic flux path is generated between the plurality of permanent magnet pairs, the air gap and the outer and inner rotor portion cores, the magnetic flux path inducing electrical power in the windings and causing mechanical power to be transferred between the inner rotor portion and the outer rotor portion.

15. The gas turbine engine as set forth in claim 14, wherein one of the shafts is driven by the LP turbine and the other shaft is driven by the HP spool.

16. An electromagnetically variable transmission for transferring power between a pair of independently rotating shafts, comprising:

a hollow cylindrical outer rotor portion and a cylindrical inner rotor portion, the inner rotor being disposed within a center aperture of the outer rotor portion and independently rotatable within the outer rotor portion, and the outer rotor independently rotatable circumferentially about the inner rotor portion;

a first one of the outer rotor portion and the inner rotor portion having a plurality of permanent magnets pairs spaced about a first surface, the magnets being configured in pairs and facing an air gap, the air gap disposed between the outer rotor portion and the inner rotor portion;

another one of the outer and inner rotor portions having a plurality of slots spaced about a magnetically permeable core portion, at least some of the slots including windings embedded therein, the windings arranged in pole pairs such that each pole pair corresponds to a permanent magnet pair of the first one of the outer rotor portion and the inner rotor portion;

the outer rotor portion and the inner rotor portion being simultaneously rotatable in one direction; and at least one auxiliary coil for powering a torque control circuit, the torque control circuit including a power supply, a controller portion and at least one power switch, the controller portion configured to operate the power switch for switching a circulating current in at least one of the windings for controlling the mechanical power transfer;

the windings configured with three of the windings series connected in a loop and the at least one power switch disposed in the series loop to regulate current flowing through the windings; and wherein, in response to co-rotation of the outer rotor portion and the inner rotor portion, a magnetic flux path is generated between the plurality of permanent magnet pairs, the air gap and the outer and inner rotor portion cores, the magnetic flux path inducing electrical power in the windings and causing mechanical power to be transferred between the inner rotor portion and the outer rotor portion.

* * * * *